United States Patent
Cho

(10) Patent No.: US 6,934,565 B2
(45) Date of Patent: Aug. 23, 2005

(54) APPARATUS AND METHOD FOR CONTROLLING MULTI-FUNCTION DEVICE OF MOBILE TERMINAL

(75) Inventor: Seung-Hyun Cho, Anyang (KR)

(73) Assignee: LG Electronics Inc., Seoul (KR)

( * ) Notice: Subject to any disclaimer, the term of this patent is extended or adjusted under 35 U.S.C. 154(b) by 485 days.

(21) Appl. No.: 10/104,620

(22) Filed: Mar. 22, 2002

(65) Prior Publication Data

US 2003/0100349 A1 May 29, 2003

(30) Foreign Application Priority Data

Nov. 27, 2001 (KR) ........................................ 2001-74364

(51) Int. Cl.⁷ ................................................ H04M 1/00
(52) U.S. Cl. ................. 455/567; 455/550.1; 455/575.1; 455/567; 379/373.01
(58) Field of Search .............................. 455/550.1, 567, 455/575.1; 379/373

(56) References Cited

U.S. PATENT DOCUMENTS 6,259,935 B1 * 7/2001 Saiki et al. ................. 455/567
2002/0025838 A1 * 2/2002 Kawamura .................. 455/567

FOREIGN PATENT DOCUMENTS

| JP | 09-233798 | 9/1997 | .......... H02K/33/02 |
| JP | 10-271188 | 10/1998 | ............ H04M/1/00 |
| JP | 2000-165487 | 6/2000 | ............ H04M/1/00 |

* cited by examiner

Primary Examiner—Erika A. Gary
Assistant Examiner—Wayne Cai
(74) Attorney, Agent, or Firm—Lee, Hong, Degerman, Kang & Schmadeka, P.C.

(57) ABSTRACT

An apparatus and method for controlling a Multi-Function Device (MFD) of a mobile terminal has a filter circuit converted according to operation modes of the MFD and the apparatus includes a differential amplifier for amplifying an audio signal, an audio filter comprising first and second audio filters connected to the differential amplifier, for varying frequency of the audio signal according to a control signal of the operation modes of the mobile terminal and a switching unit for switching the audio signal with one of the plurality of filters according to the control signal of operation modes. Also, there is an advantage that the apparatus in accordance with the present invention can prevent erroneous performance of the MFD and achieve efficient performance by generating an audio signal classifying frequency characteristic and amplifying gain of the audio filter according to the modes of vibration output, melody output and speech output.

21 Claims, 3 Drawing Sheets

APPARATUS AND METHOD FOR CONTROLLING MULTI-FUNCTION DEVICE OF MOBILE TERMINAL

CROSS REFERENCE TO RELATED ART

This application claims the benefit of Korean Patent Application No. 2001-74364, filed on Nov. 27, 2001, which is hereby incorporated by reference in its entirety.

BACKGROUND OF THE INVENTION

1. Field of the Invention

The present invention relates to a Multi-Function Device (MFD) of a mobile terminal and particularly, to an apparatus and method for controlling a MFD of a mobile terminal to efficiently control the MFD according to operation modes of the mobile terminal.

2. Description of the Related Art

Recently, as mobile terminals are miniaturized and lightened, many components having many functions integrated to one component are used to miniaturize and reduce the number of components. A representative example of such an integrated component is a MFD.

The MFD is a component of a mobile terminal integrating functions of vibration, melody and speech and three functions of a vibration motor, buzzer and earpiece can be embodied in a single component. The MFD is divided into a voice coil and vibration coil having different resonance frequencies respectively. When a low vibration resonance frequency (fo) is inputted in the vibration coil, a vibration function is performed and when a voice band frequency is inputted in a voice coil, a voice is generated.

Therefore, when using the MFD, the manufacturing cost is reduced when compared to using conventional components. Also, when the MFD is efficiently used, the mobile terminal can have fewer components and thus can be miniaturized and lightened.

FIG. 1 is a view showing the apparatus for controlling the MFD of a mobile terminal in accordance with a conventional art.

As shown in FIG. 1, the apparatus for controlling the MFD of a mobile terminal includes a vocoder 10 for converting a digital voice signal inputted from the outside to a Pulse Code Modulation (PCM) signal, a codec 20 for encoding or decoding an output signal (PCM_out) of a vocoder 10, an audio amplifier 30 for outputting a driving signal (Audio_out) by amplifying/filtering an analog voice signal (Codec_out) outputted from the codec 20, a MFD 50 for respectively embodying reception of normal sound, melody and vibration functions according to the driving signal (Audio_out) of the audio amplifying unit 30.

The operation of the apparatus for controlling the MFD of a mobile terminal with the above structure, will be described as follows.

Firstly, the inputted digital voice signal is converted to a PCM signal (PCM_out) and inputted to the codec 20 by the vocoder 10. The codec 20 converts the PCM signal (PCM_out) to an analog signal (Codec_out) using a DAC (digital to analog converter) circuit (not shown) and outputs the signal to the audio amplifying unit 30. The audio amplifying unit 30 amplifies the inputted analog voice signal (Codec_out) to a certain level and adjusts the frequency response characteristic. Therefore, the MFD 50 can perform the speech, receiving sound and melody functions respectively according to the driving signal (Audio_out) of the audio amplifying unit 30.

Namely, the MFD 50 performs the vibration mode when the frequency of the driving signal (Audio_out) corresponds to a vibration frequency (fo) and outputs a sound having a response characteristic of the corresponding frequency when the frequency corresponds to another frequency bands. At this time, the codec 20 generates a sine wave form as the vibration frequency (fo) when a vibration mode is selected by a microprocessor, generates a wave form corresponding to a chord when of a melody mode is selected and a voice signal when a speech sound mode is selected.

FIG. 2A is a detailed circuit view showing the audio amplifying unit 30, including an audio amplifier 30A for amplifying the analog voice signal (Codec_out) of the codec 20 and an audio filter 40 for adjusting the frequency response characteristic of the amplified voice signal.

The amplifying gain and filter characteristic of the audio amplifying unit 30 is determined by the values of the resistors R1 and R2 of the audio filter 40 and values of the capacitor C1 and C2. Namely, the gain of the driving signal (Audio_out) is determined by the R2/R1 and as shown in FIG. 2B. The characteristic of the audio filter 40 has the characteristic of a band pass filter and the frequencies of the passband f1 and f2 are determined by the following formulas.

$$f1 = 1/(2\pi * R1 * C1)$$

$$f2 = 1/(2\pi * R2 * C2)$$

The passband frequencies f1 and f2 are generally set at about 300 Hz and about 3 KHz, respectively.

If the mobile terminal is set as a vibration mode, the codec 20 generates the vibration frequency (fo) of about 160 Hz under control of a microprocessor (not shown) and outputs the frequency. The vibration frequency (fo) of about 160 Hz is transmitted to the MFD 50 with the amplifying gain reduced in passing through the audio filter 40. Therefore, the MFD 50 is operated in the vibration mode by the transmitted vibration frequency (fo).

A problem may occur if the vibration force of the MFD 50 is weakened when the output of the vibration frequency (fo) inputted from the conventional audio amplifying unit to the MFD 50 is reduced to lower, than an optimum level. The set value of the passband may be set at about 200 Hz instead of about 300 Hz in order to prevent reduction of the output level of the vibration frequency (fo), thereby satisfying the vibration force of the vibration frequency (fo). However, the MFD 50 may generate unnecessary vibration if a low frequency component around 200 Hz is present in generating a melody or speech sound.

Namely, when processing all functions of receiving sound, melody and vibration, unnecessary vibration may be generated in the MFD, due to the low frequency components present in the driving signal typically generated by a busy signal and/or melody. Accordingly, adjustment of the sound volume is difficult since erroneous performance of the MFD may occur or the output level necessary for certain modes may not be satisfied.

SUMMARY OF THE INVENTION

Therefore, an object of the present invention is to provide an apparatus and method for controlling a MFD of a mobile terminal capable of preventing an erroneous operation of the MFD by efficiently controlling the MFD according to operation modes, such as speech, melody and vibration modes.

Another object of the present invention is to provide an apparatus and method for controlling a MFD of a mobile terminal, which can perform optimum functions in speech, melody and vibration modes.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a mobile terminal comprises a control unit for providing an operation mode control signal; a Multi-Function Device (MFD) for performing at least one function in response the operation mode control signal; and an amplifying unit in communication with the control unit and having a plurality of filtering characteristics and for generating a drive signal with an input signal in response to the operation mode control signal, wherein the input signal is filtered in at least one of gain and frequency to produce the drive signal in response to the operation mode of the mobile terminal.

According to one aspect of the present invention, the operation mode is at least one of vibration mode, melody mode and speech mode.

According to another aspect of the present invention, the amplifying unit comprises an amplifier receiving the input signal; a filter unit connected to the amplifier for varying frequency of the input signal according to the operation mode control signal; and a switching unit for selecting one of a plurality of frequency values of the filter unit in response to the operation mode control signal. Preferably, the amplifier is a differential amplifier, and the filter unit has a characteristic of a band pass filter.

According to one aspect of the present invention, the filter unit has a first plurality of filters that is connected to an input of the amplifier and a second plurality of filters that is connected to the input and an output of the amplifier. Preferably, the first plurality of filters has a characteristic of a high pass filter, and the second plurality of filters has a characteristic of a low pass filter.

According to one aspect of the present invention, the switching unit comprises a first switch for selectively transferring the input signal to one of the first plurality of filters in response to the operation mode control signal; and a second switch for selectively transferring the input signal to one of the second plurality of filters in response to the operation mode control signal.

According to one aspect of the present invention, the MFD includes a vibrating mode that is enabled when the drive signal includes a signal in a vibration frequency, and when the operation mode control signal indicates melody mode, a pass frequency of the filter unit greater than the vibration frequency.

According to one aspect of the present invention, the MFD includes a vibrating mode that is enabled when the drive signal includes a signal in a vibration frequency, and when the operation mode control signal indicates vibration mode, the vibration frequency is within a pass frequency of the filter unit.

According to another aspect of the present invention, a pass gain for the filter unit in the vibration mode is greater than the pass gain in the melody mode.

According to another embodiment of the present invention, an apparatus for driving a multi-functional device in a mobile terminal, wherein the multi-functional device is capable of producing at least one of audio signal, vibration and incoming call signal, comprises a control unit for providing an operation mode control signal; and an amplifying unit in communication with the control unit and having a plurality of filtering characteristics and for generating a drive signal with an input signal in response to the operation mode control signal. The input signal is filtered in at least one of gain and frequency to produce the drive signal in response to the operation mode of the mobile terminal. Moreover, the drive signal controls the multi-functional device in at least one of audio signal, vibration and incoming call signal mode.

According to one aspect of the invention, the amplifying unit comprises an amplifier receiving the input signal; a filter unit connected to the amplifier for varying frequency of the input signal according to the operation mode control signal; and a switching unit for selecting one of a plurality of frequency values of the filter unit in response to the operation mode control signal.

In another embodiment, an apparatus for controlling a MFD of a mobile terminal includes a Multi-Function Device (MFD) for performing operation modes of a mobile terminal and an audio amplifying unit for generating MFD driving signal by varying gain and frequency of an audio signal according to the operation modes of the mobile terminal. Preferably, the operation modes are vibration output, melody output and speech output modes.

More preferably, the audio amplifying unit includes a differential amplifier for amplifying an audio signal; an audio filter comprising first and second audio filters connected to the differential amplifier, for varying frequency of the audio signal according to a control signal of the operation modes of the mobile terminal; and a switching unit for switching the audio signal with one of the plurality of filters according to the control signal of operation modes.

It is preferable that the audio filter has a characteristic of a band pass filter.

It is more preferable that first audio filter is connected to an input device of the differential amplifier and the second audio filter is connected to an input/output device of the differential amplifier.

It is still preferable that the first audio filter has a characteristic of a high pass filter and second audio filter has a characteristic of a low pass filter. Also, it is preferable that the switching unit includes a first switch for switching an inputted audio signal to a certain filter in the first audio filter according to the control signal of the operation mode; and a second switch for switching the audio signal of the first audio filter to a certain filter in the second audio filter according to the control signal of the operation mode.

Preferably, the audio amplifying unit includes a first filtering unit comprising a plurality of low pass filters (LPF); a differential amplifier for amplifying the output of the first filtering unit; a second filtering unit comprising a plurality of high pass filters (HPF), connected between the first filtering unit and an output of a differential amplifier; a first switching unit for switching the audio signal with one of the plurality of HPFs according to the control signal of the operation mode; and a second switching unit for switching the output of the first filtering unit with one of the plurality of HPFs according to the control signal of the operation mode.

Also, a MFD controlling apparatus in accordance with the present invention includes a MFD for performing operation modes of a mobile terminal, an audio filter comprising first and second audio filters connected to a differential amplifier, for varying frequency of the audio signal according to the control signal of the operation modes of the mobile terminal and a switching unit for switching the audio signal with one of the plurality of filters according to the control signal of operation modes.

Also, a MFD controlling apparatus in accordance with the present invention includes a first filtering unit comprising a plurality of low pass filters, a differential amplifier for amplifying an output of the first filtering unit, a second filtering unit for switching the output of the first filtering unit with one of a plurality of HPFs according to a control signal of an operation mode, a first switching unit for switching the audio signal with one of the plurality of LPFs according to the control signal of the operation mode, a second switching unit for switching the output of the first filtering unit with one of the plurality of HPFs according to the control signal of the operation mode and a MFD for performing modes of a mobile terminal according to the differential amplifier.

Also, according to the present invention, a method for controlling a MFD of a mobile terminal is provided. The method includes a first step of inputting the audio signal, a second step of varying the amplifying gain and filter characteristic of the audio signal according to the operation modes of the mobile terminal and a third step of performing corresponding operation modes according to the varied audio signal. Preferably, the operation modes include vibration output, melody output and speech output modes.

More preferably, the varied audio signal has a higher frequency band than vibration resonance frequency in case of a speech output mode.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Figure 1:
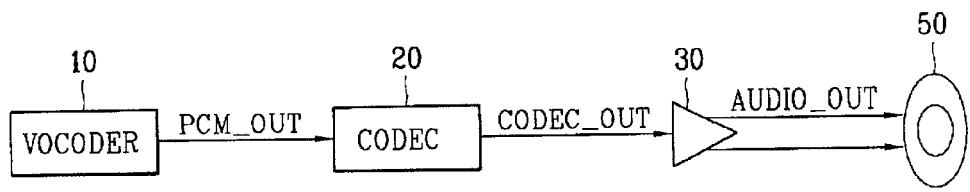
FIG. 1 is a view showing an apparatus for controlling a MFD of a mobile terminal in accordance with a conventional art.
Figure 2A:
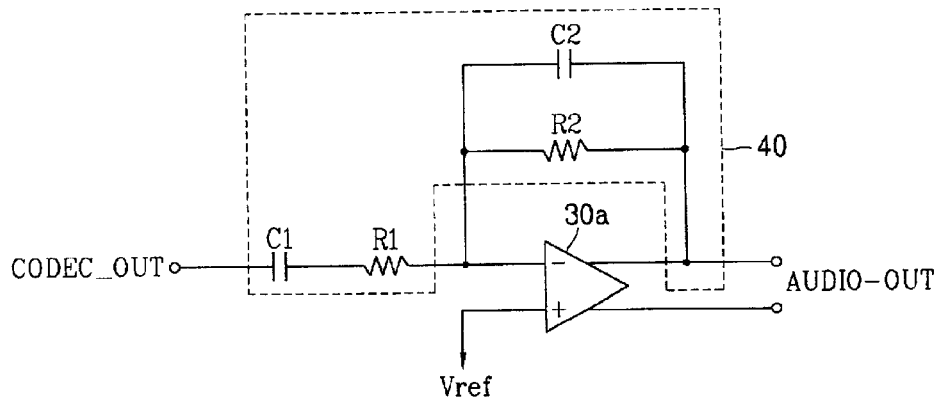
FIG. 2A is a view showing a conventional audio amplifying unit.
Figure 2B:
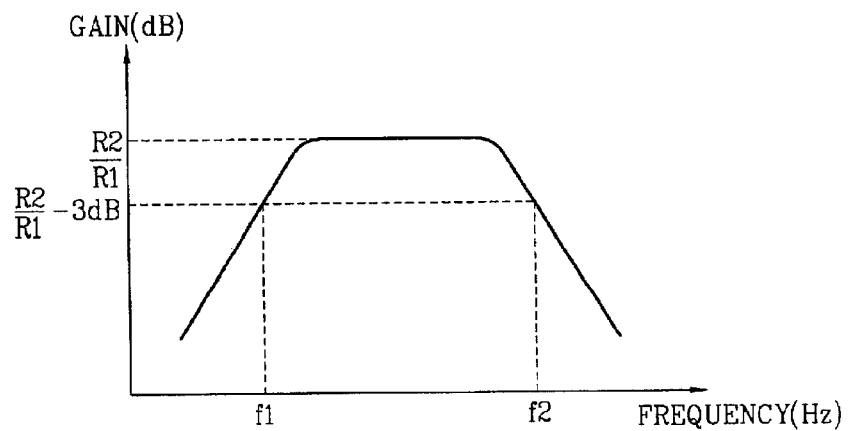
FIG. 2B is a view showing a conventional frequency characteristic of an audio filter.
Figure 3:
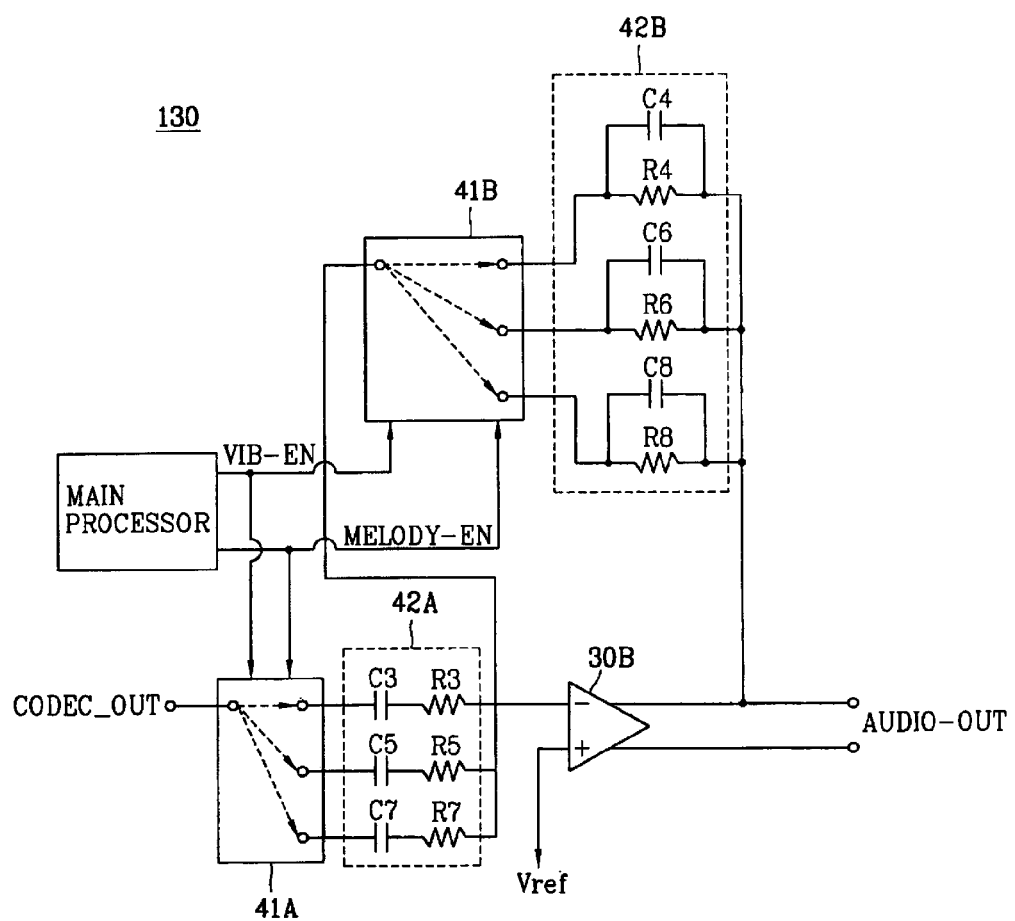
FIG. 3 is a view showing an audio amplifying unit in accordance with the present invention.

Reference will now be made in detail to the preferred embodiments of the present invention, examples of which are illustrated in the accompanying drawings. FIG. 3 is a detailed view showing an audio amplifying unit in accordance with the preferred embodiment of the present invention.

The audio amplifying unit 130 shown in FIG. 3 includes a first filtering unit 42A comprising a plurality of high pass filters (HPF), a differential amplifier 30B for amplifying an output of the first filtering unit 42A, a second filtering unit 42B comprising a plurality of low pass filters (LPF) and connected between the first filtering unit 42A and an output of the differential amplifier 30B, a first switching unit 41A for switching the audio or input signal with one of the plurality of HPFs according to the control signal of the operation mode and a second switching unit 41B for switching the output of the first filtering unit 42A with one of the plurality of LPFs according to the control signal of the operation mode.

Preferably, the first filtering unit 42A and second filtering unit 42B comprises additional circuits including resistors R3, R4, R5, R6, R7 and R8 and capacitors C3, C4, C5, C6, C7 and C8 according to the operational modes to obtain amplifying gain and filter characteristics corresponding to respective operation modes.

Also, the first switching unit 41A and the second switching unit 41B perform switching operations according to the operation mode signals generated in a microprocessor of the mobile terminal. Preferably, by properly composing a circuit of the mobile terminal, respective operation modes can have proper amplifying gain and audio filter characteristics of respective operation modes by generating certain driving signals according to respective modes of vibration output, melody output and speech sound output and applying the driving signals to the differential amplifier 30B.

The first filtering unit 42A and the second filtering unit 42B each comprise an audio filter, and the first switch 41A and the second switch 41B each comprise a switching unit. Operation of the apparatus for controlling the MFD of the mobile terminal will be described as follows.

The first switch 41A and the second switch 41B connect the circuits of the corresponding modes of the first filtering unit 42A and the second filtering unit 42B according to the control of the operation mode signal generated in the microprocessor in accordance with the present invention.

The audio signal is transmitted to the MFD 50 through the first filtering unit 42A and the second filtering unit 42B, connected by the first and second switches 41A and 41B. The amplifying gain and filter characteristic is varied by the value of the resistors R3, R4, R5, R6, R7 and R8 and capacitors C2, C4, C5, C6, C7 and C8 which comprise the first filtering unit 42A and the second filtering unit 42B. Accordingly, the output value of the audio signal inputted according to the operation mode varies. The varied input to the MFD 50 controls the operation of the MFD 50.

Figure 4A:
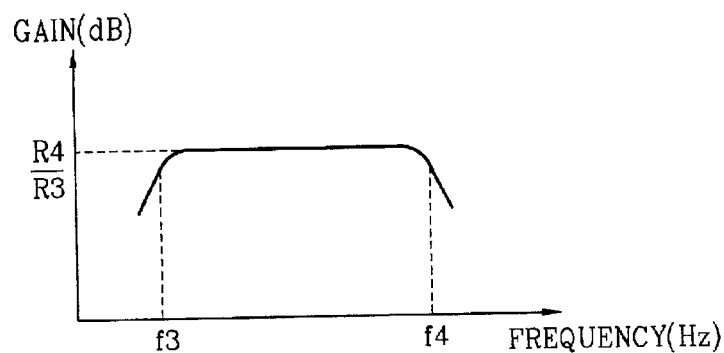
FIGS. 4A, 4B and 4C are views showing characteristics of an audio filter for respective operation modes in accordance with the present invention.
Figure 4B:
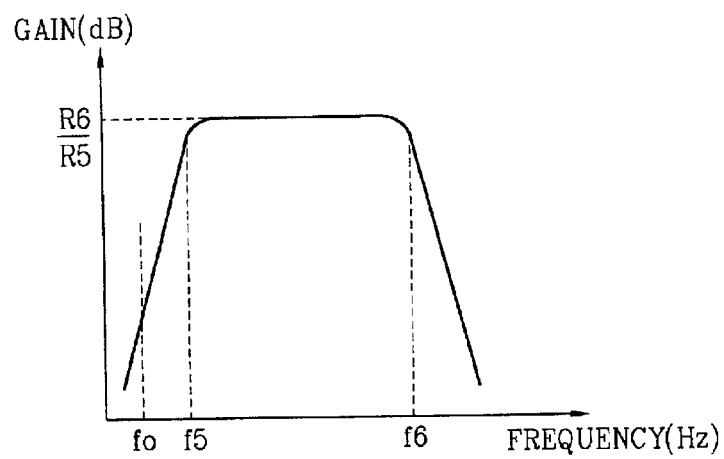
Figure 4C:
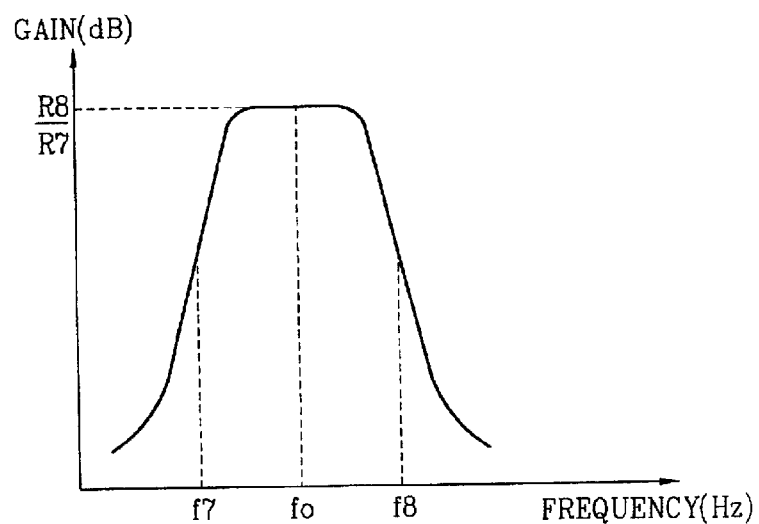

A method for controlling the MFD of the mobile terminal in accordance with the preferred embodiment of the present invention will be described using the filter characteristic of FIGS. 4A, 4B and 4C as follows.

The operation mode control signal generated in the microprocessor of the mobile terminal is inputted to the first switch 41A and the second switch 41B. For example, when the operation mode control signal drives the MFD 50 in a vibration output mode, the Vib_En signal is set to logical high and when the operation mode control signal drives the MFD in a melody output mode, the melody_En signal is set to logical high. However, when the operation mode control signal drives the MFD in a speech sound mode as opposed to vibration output mode or melody output mode, the Vib_En and Melody_En signals are set to logical low, thereby causing the MFD 50 to perform the function of a receiver.

The first filtering unit 42A and the second filtering unit 42B are connected according to the operation mode control signal inputted to the first switch 41A and the second switch 41B.

For example, in case of speech sound output mode, the Vib_En and Melody_En signals are all low and the first switch 41A and the second switch 41B connects the R3, C3, R4 and C4 of the audio filter. At this time, as shown in FIG. 4A, the amplifying gain of the differential amplifier 30B becomes R4/R3 and the pass frequency has the characteristic of the band pass filter that has pass frequencies between (f3) and (f4).

In case of melody output mode, the Melody_En signal is changed to high and the first switch 41A and the second switch 41B connect the R5, C5, R6 and C6 of the audio filter. At this time, as shown in FIG. 4B, the amplifying gain of the differential amplifier 30B is R6/R5. Preferably, R6/R5 is chosen to be larger than R4/R3 since a larger amplifying gain is necessary in case of the melody output mode than in the speech sound output mode. Also, the frequency value of f5=1/(2*π*R5*C5) must be set higher than the vibration resonance frequency (fo) of the MFD 50 in order to prevent generation of unnecessary vibration.

Also, in case of the vibration output mode, the Vib_En signal is changed to high and the first switch 41A and the second switch 41B connect the R7, R7 and R8, C8 of the audio filter. At this time, as shown in FIG. 4C, the MFD 50 has a certain vibration resonance frequency (fo) and a vibration output is generated when the vibration resonance (fo) is inputted. Therefore, in case of the vibration output mode, values of the resistors R7 and R8 and the capacitors C7 and C8 are preferably chosen to set the vibration resonance frequency (fo) between the pass frequencies (f7) and (f8).

The signals transmitted to the MFD 50 are adjusted since the first and second filtering units 42A and 42B connected by the first switch and the second switch have an output gain and filter characteristic corresponding to the operation modes. The MFD 50 receives the converted signals and performs a corresponding operation mode.

As described above, the apparatus for controlling the MFD of the mobile terminal in accordance with the present invention can adjust the filter characteristic by varying the audio filter according to the vibration output, melody output and speech sound output modes, thus to prevent unnecessary vibration from being generated in the MFD by the low frequency included in the sound in performing the melody output mode and speech sound output mode.

Also, for controlling the MFD of the mobile terminal in accordance with the present invention can prevent erroneous operation and perform the MFD efficiently by generating clearly classified signals generated according to the operation modes.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A mobile terminal, comprising:
   a control unit for providing an operation mode control signal;
   a Multi-Function Device (MFD) for performing at least one function in response to the operation mode control signal; and
   an amplifying unit in communication with the control unit for generating a drive signal with an input signal in response to the operation mode control signal, the amplifying unit comprising:
   an amplifier receiving the input signal,
   a filter unit connected to the amplifier for varying frequency of the input signal according to the operation mode control signal, the filter unit comprising a first plurality of filters connected to an input of the amplifier and a second plurality of filters connected to the input and an output of the amplifier, and
   a switching unit for selecting one of a plurality of frequency values of the filter unit in response to the operation mode control signal,
   wherein the input signal is filtered in at least one of gain and frequency to produce the drive signal in response to the operation mode of the mobile terminal.

2. The mobile terminal of claim 1, wherein the operation mode is at least one of vibration mode, melody mode and speech mode.

3. The mobile terminal of claim 1, wherein the amplifier is a differential amplifier.

4. The mobile terminal of claim 1, wherein the filter unit has a characteristic of a band pass filter.

5. The mobile terminal of claim 1, wherein the first plurality of filters has a characteristic of a high pass filter.

6. The mobile terminal of claim 1, wherein the second plurality of filters has a characteristic of a low pass filter.

7. The mobile terminal of claim 1, wherein the switching unit comprises:
   a first switch for selectively transferring the input signal to one of the first plurality of filters in response to the operation mode control signal; and
   a second switch for selectively transferring the input signal to one of the second plurality of filters in response to the operation mode control signal.

8. The mobile terminal of claim 1, wherein the MFD includes a vibrating mode that is enabled when the drive signal includes a signal in a vibration frequency, and when the operation mode control signal indicates melody mode, a pass frequency of the filter unit greater than the vibration frequency.

9. The mobile terminal of claim 8, wherein the MFD includes a vibrating mode that is enabled when the drive signal includes a signal in a vibration frequency, and when the operation mode control signal indicates vibration mode, the vibration frequency is within a pass frequency of the filter unit.

10. The mobile terminal of claim 9, wherein a pass gain for the filter unit in the vibration mode is greater than the pass gain in the melody mode.

11. The mobile terminal of claim 1, wherein the MFD includes a vibrating mode that is enabled when the drive signal includes a signal in a vibration frequency, and when the operation mode control signal indicates vibration mode, the vibration frequency is within a pass frequency of the filter unit.

12. An apparatus for driving a multi-functional device in a mobile terminal, the multi-functional device capable of producing at least one of an audio signal, a vibration and an incoming call signal, the apparatus comprising:
   a control unit for providing an operation mode control signal; and
   an amplifying unit in communication with the control unit for generating a drive signal with an input signal in response to the operation mode control signal, the amplifying unit comprising:
   an amplifier receiving the input signal,
   a filter unit connected to the amplifier for varying frequency of the input signal according to the operation mode control signal, the filter unit comprising a first plurality of filters connected to an input of the amplifier and a second plurality of filters connected to the input and an output of the amplifier, and a switching unit for selecting one of a plurality of frequency values of the filter unit in response to the operation mode control signal, wherein the input signal is filtered in at least one of gain and frequency to produce the drive signal in response to the operation mode of the mobile terminal, the drive signal controlling the multi-functional device in at least one of an audio signal mode, a vibration mode and an incoming call mode.

13. The apparatus of claim 12, wherein the filter unit has a characteristic of a band pass filter.

14. The apparatus of claim 12, wherein the first plurality of filters has a characteristic of a high pass filter.

15. The apparatus of claim 12, wherein the second plurality of filters has a characteristic of a low pass filter.

16. The apparatus of claim 12, wherein the switching unit comprises:

a first switch for routing the input signal to one of the first plurality of filters in response to the operation mode control signal; and a second switch for routing the input signal to one of the second plurality of filters in response to the operation mode control signal.

17. The apparatus claim 12, wherein when the vibration mode is enabled, the drive signal includes a signal in a vibration frequency and the vibration frequency is within a pass frequency of the filter unit.

18. The apparatus of claim 12, wherein when the incoming call mode is enabled, a pass frequency of the filter unit is greater than a vibration frequency of the multi-functional device that enables the multi-functional device to vibrate.

19. The apparatus of claim 12, wherein a pass gain for the filter unit in the vibration mode is greater than the pass gain in the incoming call mode.

20. An apparatus for controlling a MFD of a mobile terminal, comprising:

a first filtering unit comprising a plurality of high pass filters;

a differential amplifier for amplifying an output of the first filtering unit;

a second filtering unit for switching the output of the first filtering unit with one of a plurality of low pass filters according to a control signal;

a first switching unit for selectively switching an input signal with one of the plurality of high pass filters according to the control signal; and a second switching unit for selectively switching the output of the first filtering unit with one of the plurality of low pass filters according to the control signal.

21. A method for controlling a MFD of a mobile terminal, comprising the steps of:

providing an input signal;

generating an operation mode control signal from a control unit;

selectively choosing one of a first plurality of high pass fitters in an amplifying unit in response to the operation mode control signal;

selectively choosing one of a second plurality of low pass filters in the amplifying unit in response to the operation mode control signal; and outputting a drive signal to the MFD in response to the operation mode control signal.

* * * * *